US011039109B2

(12) United States Patent
Davies

(10) Patent No.: US 11,039,109 B2
(45) Date of Patent: *Jun. 15, 2021

(54) SYSTEM AND METHOD FOR ADJUSTING AN IMAGE FOR A VEHICLE MOUNTED CAMERA

(71) Applicant: Fox Sports Productions, Inc., Los Angeles, CA (US)

(72) Inventor: Michael Davies, Marina Del Rey, CA (US)

(73) Assignee: FOX SPORTS PRODUCTIONS, LLC, Los Angeles, CA (US)

( * ) Notice: Subject to any disclaimer, the term of this patent is extended or adjusted under 35 U.S.C. 154(b) by 316 days.

This patent is subject to a terminal disclaimer.

(21) Appl. No.: 14/207,998

(22) Filed: Mar. 13, 2014

(65) Prior Publication Data

US 2014/0240500 A1  Aug. 28, 2014

Related U.S. Application Data

(63) Continuation-in-part of application No. 13/567,323, filed on Aug. 6, 2012.

(60) Provisional application No. 61/778,641, filed on Mar. 13, 2013, provisional application No. 61/515,549, filed on Aug. 5, 2011, provisional application No. 61/563,126, filed on Nov. 23, 2011.

(51) Int. Cl.
| | |
|---|---|
| *H04N 7/18* | (2006.01) |
| *H04N 5/232* | (2006.01) |
| *B60R 1/00* | (2006.01) |
| *H04N 5/262* | (2006.01) |
| *H04N 7/01* | (2006.01) |
| *H04N 5/222* | (2006.01) |

(52) U.S. Cl.
CPC ............... *H04N 7/183* (2013.01); *B60R 1/00* (2013.01); *H04N 5/23206* (2013.01); *H04N 5/23248* (2013.01); *H04N 5/23258* (2013.01); *H04N 5/23293* (2013.01); *H04N 5/232933* (2018.08); *H04N 5/2628* (2013.01); *B60R 2300/302* (2013.01); *H04N 5/222* (2013.01); *H04N 7/0117* (2013.01)

(58) Field of Classification Search
CPC ...................................................... H04N 7/183
USPC ........................................................ 348/148
See application file for complete search history.

(56) References Cited

U.S. PATENT DOCUMENTS

| | | |
|---|---|---|
| 4,184,270 A | 1/1980 | Presbrey |
| 4,679,068 A | 7/1987 | Lillquist et al. |
| 4,975,770 A | 12/1990 | Troxell |

(Continued)

FOREIGN PATENT DOCUMENTS

| | | |
|---|---|---|
| CA | 2213485 A1 | 2/1995 |
| CN | 101090472 | 12/2007 |

(Continued)

OTHER PUBLICATIONS

CN Application No. 201280044974.9 First Office Action and Search Report dated Sep. 30, 2015, 14 pages.

(Continued)

*Primary Examiner* — Fabio S Lima
(74) *Attorney, Agent, or Firm* — Cantor Colburn LLP

(57) ABSTRACT

A system and method provides an image that adjusts in response to at least one vehicle mounted sensor.

27 Claims, 12 Drawing Sheets

(56) References Cited

U.S. PATENT DOCUMENTS

| | | | |
|---|---|---|---|
| 5,517,236 A * | 5/1996 | Sergeant | G08B 13/19626 348/143 |
| 5,729,471 A | 3/1998 | Jain et al. | |
| 5,865,624 A * | 2/1999 | Hayashigawa | G09B 9/04 434/29 |
| 5,892,554 A | 4/1999 | DiCicco et al. | |
| 6,100,925 A | 8/2000 | Rosser et al. | |
| 6,144,375 A | 11/2000 | Jain et al. | |
| 6,154,250 A | 11/2000 | Honey et al. | |
| 6,201,554 B1 * | 3/2001 | Lands | G06F 1/1626 345/156 |
| 6,224,492 B1 | 5/2001 | Grimes | |
| 6,525,690 B2 | 2/2003 | Rudow et al. | |
| 6,750,919 B1 | 6/2004 | Rosser | |
| 6,774,932 B1 | 8/2004 | Ewing et al. | |
| 6,958,772 B1 | 10/2005 | Sugimori | |
| 7,158,676 B1 | 1/2007 | Rainsford | |
| 7,250,952 B2 | 7/2007 | Johnson et al. | |
| 7,315,631 B1 | 1/2008 | Corcoran et al. | |
| 7,356,082 B1 | 4/2008 | Kuhn | |
| 7,380,259 B1 | 5/2008 | Schroeder | |
| 7,450,758 B2 | 11/2008 | Cohen et al. | |
| 7,529,298 B2 | 5/2009 | Yasuda | |
| 7,693,679 B1 | 4/2010 | Warnke et al. | |
| 7,839,926 B1 | 11/2010 | Metzger et al. | |
| 7,873,910 B2 | 1/2011 | Chaudhri et al. | |
| 7,996,771 B2 | 8/2011 | Girgensohn et al. | |
| 8,381,259 B1 | 2/2013 | Khosla | |
| 8,495,697 B1 | 7/2013 | Goldfeder et al. | |
| 8,648,857 B2 | 2/2014 | Williams | |
| 8,702,504 B1 | 4/2014 | Hughes et al. | |
| 8,743,219 B1 * | 6/2014 | Bledsoe | G06T 5/006 348/208.4 |
| 8,756,641 B2 | 6/2014 | Ivanov et al. | |
| 8,949,889 B1 | 2/2015 | Erdmann | |
| 9,094,615 B2 | 7/2015 | Aman et al. | |
| 9,137,558 B2 | 9/2015 | Gibbon et al. | |
| 9,138,652 B1 | 9/2015 | Thompson et al. | |
| 9,288,545 B2 | 3/2016 | Hill et al. | |
| 9,535,879 B2 | 1/2017 | Allen | |
| 2002/0019258 A1 | 2/2002 | Kim et al. | |
| 2002/0057217 A1 | 5/2002 | Milnes et al. | |
| 2002/0082122 A1 | 6/2002 | Pippin et al. | |
| 2002/0090217 A1 * | 7/2002 | Limor | H04N 5/222 396/429 |
| 2002/0118875 A1 | 8/2002 | Wilensky | |
| 2002/0168006 A1 | 11/2002 | Yasuda | |
| 2003/0009270 A1 * | 1/2003 | Breed | B60C 11/24 701/32.4 |
| 2003/0021445 A1 | 1/2003 | Larice et al. | |
| 2003/0033602 A1 | 2/2003 | Gibbs et al. | |
| 2003/0151835 A1 * | 8/2003 | Su | B60R 1/00 359/843 |
| 2003/0210329 A1 | 11/2003 | Aagaard et al. | |
| 2004/0218099 A1 | 11/2004 | Washington | |
| 2004/0261127 A1 | 12/2004 | Freeman et al. | |
| 2005/0052533 A1 | 3/2005 | Ito et al. | |
| 2005/0137958 A1 | 6/2005 | Huber et al. | |
| 2005/0147278 A1 | 7/2005 | Rui et al. | |
| 2005/0237385 A1 * | 10/2005 | Kosaka | G01B 11/00 348/42 |
| 2005/0255914 A1 | 11/2005 | McHale et al. | |
| 2006/0003825 A1 | 1/2006 | Iwasaki et al. | |
| 2006/0044410 A1 | 3/2006 | Shinkai et al. | |
| 2006/0078047 A1 | 4/2006 | Shu et al. | |
| 2006/0078329 A1 | 4/2006 | Ohnishi et al. | |
| 2006/0197839 A1 | 9/2006 | Senior et al. | |
| 2006/0197843 A1 * | 9/2006 | Yoshimatsu | H04N 5/23293 348/219.1 |
| 2006/0197849 A1 | 9/2006 | Wernersson | |
| 2007/0018952 A1 | 1/2007 | Arseneau et al. | |
| 2007/0024706 A1 | 2/2007 | Brannon, Jr. et al. | |
| 2007/0076957 A1 | 4/2007 | Wang et al. | |
| 2007/0139562 A1 | 6/2007 | Miyake | |
| 2007/0198939 A1 | 8/2007 | Gold | |
| 2008/0019299 A1 | 1/2008 | Lekutai et al. | |
| 2008/0021651 A1 | 1/2008 | Seeley et al. | |
| 2008/0129825 A1 | 6/2008 | Deangelis et al. | |
| 2008/0129844 A1 | 6/2008 | Cusack et al. | |
| 2008/0192116 A1 | 8/2008 | Tamir et al. | |
| 2008/0261711 A1 | 10/2008 | Tuxen | |
| 2008/0277486 A1 | 11/2008 | Seem et al. | |
| 2008/0311983 A1 | 12/2008 | Koempel et al. | |
| 2009/0003599 A1 | 1/2009 | Hart et al. | |
| 2009/0009605 A1 | 1/2009 | Ortiz | |
| 2009/0021583 A1 | 1/2009 | Salgar et al. | |
| 2009/0028440 A1 | 1/2009 | Elangovan et al. | |
| 2009/0031382 A1 | 1/2009 | Cope | |
| 2009/0037605 A1 | 2/2009 | Li | |
| 2009/0040308 A1 * | 2/2009 | Temovskiy | F41G 3/16 348/158 |
| 2009/0046152 A1 | 2/2009 | Aman | |
| 2009/0066782 A1 | 3/2009 | Choi et al. | |
| 2009/0067670 A1 | 3/2009 | Johnson et al. | |
| 2009/0082139 A1 | 3/2009 | Hart | |
| 2009/0136226 A1 | 5/2009 | Wu et al. | |
| 2009/0140976 A1 | 6/2009 | Bae et al. | |
| 2009/0160735 A1 | 6/2009 | Mack | |
| 2009/0262137 A1 | 10/2009 | Walker et al. | |
| 2009/0271821 A1 | 10/2009 | Zalewski | |
| 2009/0284601 A1 | 11/2009 | Eledath et al. | |
| 2009/0290848 A1 | 11/2009 | Brown | |
| 2010/0077435 A1 | 3/2010 | Kandekar et al. | |
| 2010/0091017 A1 * | 4/2010 | Kmiecik | G01C 11/02 345/420 |
| 2010/0095345 A1 | 4/2010 | Tran et al. | |
| 2010/0141772 A1 | 6/2010 | Inaguma et al. | |
| 2010/0179005 A1 | 7/2010 | Meadows et al. | |
| 2010/0192088 A1 | 7/2010 | Iwano | |
| 2010/0208082 A1 | 8/2010 | Buchner et al. | |
| 2010/0265125 A1 | 10/2010 | Kelly et al. | |
| 2010/0265344 A1 | 10/2010 | Velarde et al. | |
| 2010/0289904 A1 | 11/2010 | Zhang et al. | |
| 2010/0289913 A1 | 11/2010 | Fujiwara | |
| 2010/0321389 A1 | 12/2010 | Gay et al. | |
| 2011/0013087 A1 | 1/2011 | House et al. | |
| 2011/0013836 A1 | 1/2011 | Gefen et al. | |
| 2011/0016497 A1 | 1/2011 | Bloom et al. | |
| 2011/0067065 A1 | 3/2011 | Karaoguz et al. | |
| 2011/0149094 A1 * | 6/2011 | Chen | H04N 5/23248 348/208.3 |
| 2011/0149103 A1 | 6/2011 | Hatakeyama et al. | |
| 2011/0157370 A1 | 6/2011 | Livesey | |
| 2011/0169959 A1 | 7/2011 | Deangelis et al. | |
| 2011/0181728 A1 * | 7/2011 | Tieman | B60R 1/00 348/148 |
| 2011/0191023 A1 | 8/2011 | Engstrom | |
| 2011/0205262 A1 | 8/2011 | Cavallaro et al. | |
| 2011/0292030 A1 | 12/2011 | Jiang et al. | |
| 2011/0304843 A1 | 12/2011 | Rogers et al. | |
| 2012/0060101 A1 | 3/2012 | Vonog et al. | |
| 2012/0090010 A1 * | 4/2012 | Dace | H04N 7/181 725/75 |
| 2012/0154593 A1 | 6/2012 | Anderson | |
| 2012/0277036 A1 | 11/2012 | Lee | |
| 2012/0295679 A1 | 11/2012 | Izkovsky et al. | |
| 2012/0316843 A1 | 12/2012 | Beno et al. | |
| 2012/0331387 A1 | 12/2012 | Lemmey et al. | |
| 2013/0016099 A1 | 1/2013 | Rinard et al. | |
| 2013/0033605 A1 * | 2/2013 | Davies | H04N 7/0125 348/157 |
| 2013/0041755 A1 | 4/2013 | Ivanov | |
| 2013/0211774 A1 | 8/2013 | Bentley et al. | |
| 2013/0227596 A1 | 8/2013 | Pettis et al. | |
| 2014/0005929 A1 | 1/2014 | Gale et al. | |
| 2014/0229996 A1 | 8/2014 | Ellis et al. | |
| 2014/0236331 A1 | 8/2014 | Lehmann et al. | |
| 2014/0245367 A1 | 8/2014 | Sasaki et al. | |
| 2014/0266160 A1 | 9/2014 | Coza | |
| 2014/0344839 A1 | 11/2014 | Woods et al. | |
| 2015/0057108 A1 | 2/2015 | Regimbal et al. | |
| 2015/0062339 A1 | 3/2015 | Ostrom | |
| 2015/0094883 A1 | 4/2015 | Peeters et al. | |

(56) References Cited

U.S. PATENT DOCUMENTS

| | | |
|---|---|---|
| 2015/0149250 A1 | 5/2015 | Fein et al. |
| 2015/0149837 A1 | 5/2015 | Alonso et al. |
| 2015/0226828 A1 | 8/2015 | Davies et al. |
| 2015/0234454 A1 | 8/2015 | Kurz |
| 2015/0318020 A1 | 11/2015 | Pribula |
| 2015/0370818 A1 | 12/2015 | Des Jardins et al. |
| 2015/0382076 A1 | 12/2015 | Davisson et al. |
| 2016/0173958 A1 | 6/2016 | Ryu et al. |
| 2016/0198228 A1 | 7/2016 | Hill et al. |
| 2016/0203694 A1 | 7/2016 | Hogsten et al. |
| 2016/0217345 A1 | 7/2016 | Appel et al. |
| 2017/0201779 A1 | 7/2017 | Publicover et al. |

FOREIGN PATENT DOCUMENTS

| | | |
|---|---|---|
| EP | 2575079 | 4/2013 |
| JP | H06105231 A | 4/1994 |
| JP | H07141022 A | 6/1995 |
| JP | H08164896 | 6/1996 |
| JP | H0952555 | 2/1997 |
| JP | 2001268562 | 9/2001 |
| JP | 2003125414 A | 4/2003 |
| JP | 2003162213 A | 6/2003 |
| JP | 2003242517 | 8/2003 |
| JP | 2004048116 | 2/2004 |
| JP | 2004056473 | 2/2004 |
| JP | 2004354236 | 12/2004 |
| JP | 2004354256 | 12/2004 |
| JP | 2005073218 | 3/2005 |
| JP | 2005144003 A | 6/2005 |
| JP | 2005159385 A | 6/2005 |
| JP | 2006081696 A | 3/2006 |
| JP | 2006340108 A | 12/2006 |
| JP | 2008005110 | 1/2008 |
| JP | 2008035006 | 2/2008 |
| JP | 2008199370 | 8/2008 |
| JP | 20080199370 | 8/2008 |
| JP | 2009188976 A | 8/2009 |
| JP | 2009194234 | 8/2009 |
| JP | 2010005267 A | 1/2010 |
| JP | 2010152556 A | 7/2010 |
| JP | 2010194074 A | 9/2010 |
| JP | 2010245821 | 10/2010 |
| JP | 2011108165 | 6/2011 |
| JP | 2011130112 | 6/2011 |
| JP | 2011183138 A | 9/2011 |
| JP | 2011527527 A | 10/2011 |
| JP | 2012034365 | 2/2012 |
| JP | 2012095914 A | 5/2012 |
| JP | 2013020308 | 1/2013 |
| JP | 2013118712 A | 6/2013 |
| KR | 20060134702 | 12/2006 |
| KR | 1020090056047 | 6/2009 |
| KR | 20130086814 | 8/2013 |
| KR | 20140023136 | 2/2014 |
| WO | 0114021 | 3/2001 |
| WO | 0228093 | 4/2002 |
| WO | 2005027516 | 3/2005 |
| WO | 2008057285 | 5/2008 |
| WO | WO2010019024 | 2/2010 |
| WO | 2010140858 | 12/2010 |
| WO | 2012051054 | 4/2012 |
| WO | 2014036363 | 3/2014 |

OTHER PUBLICATIONS

EP Application No. 15156533.0 Extended European Search Report dated Jun. 10, 2015, 6 pages.
U.S. Appl. No. 13/567,323 Final Office Action dated Sep. 24, 2015, 31 pages.
EP Application No. 12822586.9 Extended European Search Report dated Feb. 5, 2015, 6 pages.
International Application No. PCT/US2013/057450 International Search Report and Written Opinion dated Dec. 27, 2013, 12 pages.
U.S. Appl. No. 13/567,323 Non-Final Office Action dated Mar. 2, 2015, 30 pages.
International Application No. PCT/US2014/025362 International Search Report and Written Opinion dated Aug. 19, 2014, 15 pages.
New Zealand Application No. 620992 First Examination Report dated Jul. 15, 2014, 2 pages.
PCT Application No. PCT/US2012/049707 Written Opinion and International Search Report dated Jan. 7, 2013, 13 pages.
JP Patent Application No. 2014-525086 Notice of Reasons for Rejection dated May 10, 2016, 5 pages.
New Zealand Patent Application No. 719619 First Examination Report dated May 19, 2016, 3 pages.
U.S. Appl. No. 13/567,323 Non-final Office Action dated Apr. 26, 2016, 35 pages.
U.S. Appl. No. 15/068,819 Non-Final Office Action dated May 6, 2016, 21 pages.
EP Application No. 13832174.0 Extended European Search Report dated Mar. 23, 2016, 9 pages.
International Application No. PCT/US2015/065472 International Search Report and Written Opinion dated Apr. 5, 2016, 14 pages.
International Application No. PCT/US2015/065474 International Search Report and Written Opinion dated Apr. 5, 2016, 12 pages.
International Application No. PCT/US2015/065477 International Search Report and Written Opinion dated Apr. 5, 2016, 11 pages.
International Application No. PCT/US2015/065481 International Search Report and Written Opinion dated Apr. 5, 2016, 12 pages.
New Zealand Patent Application No. 620992 Further Examination Report dated Feb. 1, 2016, 3 pages.
New Zealand Patent Application No. 715962 First Examination Report dated Feb. 1, 2016, 2 pages.
U.S. Appl. No. 14/424,632 Non-Final Office Action dated Nov. 6, 2015, 25 pages.
U.S. Appl. No. 14/804,637 Notice of Allowance dated Nov. 17, 2015, 18 pages.
EP Application No. 13832174.0 Office Action dated Apr. 25, 2017, 4 pages.
EP Application No. 15156533 Office Action dated May 15, 2017, 4 pages.
Australian Patent Application No. 2012294568 Office Action dated Aug. 22, 2016, 3 pages.
China Application No. 201280044974.9 Second Office Action dated Jul. 22, 2016, 10 pages.
EP Application No. 12822586.9 Office Action dated Feb. 28, 2017, 4 pages.
EP Application No. 14776040.9 Extended European Search Report dated Oct. 7, 2016, 8 pages.
JP Patent Application No. 2014-525086 Decision of Rejection dated Nov. 8, 2016, 4 pages.
U.S. Appl. No. 13/567,323 Final Office Action dated Nov. 10, 2016, 38 pages.
Austrialian Application No. 2014244374 Examination Report No. 1, dated Mar. 17, 2017, 3 pages.
U.S. Appl. No. 13/567,323 Non-Final Office Action dated May 30, 2017, 42 pages.
First Examination Report for New Zealand IP No. 734221, dated Aug. 28, 2017 (2 pp.).
Further Examination Report for New Zealand IP No. 719619, dated Oct. 16, 2017 (1 pp.).
Further Examination Report for New Zealand IP No. 719619, dated Sep. 20, 2017 (2 pp.).
Notice of Reasons for Refusal for Japanese Patent Application No. 2015-530081, shipping date Oct. 10, 2017 (10 pp.).
Rodrigues, Pedro. "A Field, Tracking and Video Editor Tool for a Football Resource Planner", IEEE Conference Publications, US, 2013 (6 pp.).
NZ Application No. 751181 First Examination Report dated Mar. 21, 2019, 2 pages.
U.S. Appl. No. 15/535,257 Final Office Action dated May 6, 2019, 31 pages.
EP Application No. 15867249.3 Oral Proceedings Summons dated Aug. 25, 2020, 10 pages.
U.S. Appl. No. 15/535,243 Non-Final Office Action dated Aug. 6, 2020, 24 pages.

(56) References Cited

OTHER PUBLICATIONS

AU Application No. 2019271924 Examination Report No. 1 dated Nov. 17, 2020, 5 pages.
EP Application No. 18809839.6 Extended EP Search Report dated Sep. 11, 2020, 7 pages.
NZ IP No. 768143; First Examination Report; dated Sep. 28, 2020, 2 pages.
Australian Application No. 2017219030 Office Action dated Feb. 12, 2019, 4 pages.
JP Patent Application No. 2016-501836 Notice of Reasons for Refusal dated Jan. 15, 2019, 3 pages.
U.S. Appl. No. 14/424,632 Final Office Action dated Feb. 8, 2019, 27 pages.
EP Application No. 15867249 EP Search Report and Written Opinion dated May 17, 2018, 8 pages.
EP Application No. 15867985 Supplementary EP Search Report and Written Opinion dated May 30, 2018, 9 pages.
EP Application No. 15868450 Supplementary EP Search Report and Written Opinion dated Jun. 1, 2018, 9 pages.
EP Application No. 15868581 Supplementary EP Search Report and Written Opinion dated Jun. 1, 2018, 8 pages.
JP Patent Application No. 2016-501836 Notice of Reasons for Refusal dated May 18, 2018, 6 pages.
Australian Application No. 151189D1AU Examination Report No. 1 dated Nov. 27, 2018, 3 pages.
International Application No. PCT/US2018/035007 International Search Report and Written Opinion dated Sep. 17, 2018, 10 pgs.
U.S. Appl. No. 15/535,243 Non-Final Office Action dated Sep. 27, 2018, 50 pages.
U.S. Appl. No. 15/535,257 Non-Final Office Action dated Sep. 20, 2018, 51 pages.
JP Patent Application No. 2014-525086 English Translation of Trial Decision issued Apr. 3, 2018, 17 pages.
U.S. Appl. No. 14/424,632 Non-Final Office Action dated Jun. 28, 2018, 44 pages.
EP Application No. 14776040.9 Office Action dated Dec. 8, 2017, 4 pages.
U.S. Appl. No. 13/567,323 Final Office Action dated Jan. 17, 2018, 44 pages.
U.S. Appl. No. 15/621,126 Non-Final Office Action dated Dec. 20, 2017, 34 pages.
Australian Application No. 2013308641 Examination Report No. 1 dated Mar. 8, 2018, 4 pages.
Golf Relay Broadcast, Proceedings of Workshop of the Institute of Television Engineers of Japan and Institute of Television Engineers of Japan Using Multimedia PC besides Katori, Nov. 26, 1993, vol. 17. No. 74, p. 23-27.
JP Patent Application No. 2017-531612 Notice of Reasons for Refusal dated Jul. 30, 2019, 6 pages.
Relay watch in the "synchronization World Cup 2006" besides ** Group work, broadcast technology, * 6 hall publication incorporated company, Jan. 1, 2007, volume [ 60th ] No. 1 (716th volume of the set), p. 19-29.
U.S. Appl. No. 13/567,323 Final Office Action dated Sep. 18, 2019, 60 pages.
Mike—More homers? Blame the seats; Published Apr. 20, 2009 (Year: 2009), 3 pages.
Newton—Autodesk wind simulation to enhance Fox Sports Super Bowl coverage; Published Jan. 31, 2014 (Year: 2014), 3 pages.
AU Application No. 2015360249 Examination Report No. 1 dated May 9, 2019, 4 pages.
AU Application No. 2015360250 Examination Report No. 1 dated May 23, 2019, 5 pages.
AU Application No. 2015360251 Examination Report No. 1 dated May 17, 2019, 5 pages.
AU Application No. 2015360252 Examination Report No. 1 dated May 8, 2019, 4 pages.
EP Application No. 15867249.3 Office Action dated Jun. 6, 2019, 8 pages.
EP Application No. 15867985.2 Office Action dated Jun. 6, 2019, 8 pages.
EP Application No. 15868450.6 Office Action dated Jun. 6, 2019, 9 pages.
EP Application No. 15868581.8 Office Action dated Jun. 6, 2019, 7 pages.
JP Patent Application No. 2017-531609 Notice of Reasons for Refusal dated Jun. 18, 2019, 3 pages.
JP Patent Application No. 2017-531610 Notice of Reasons for Refusal dated Jun. 18, 2019, 3 pages.
U.S. Appl. No. 15/535,243 Final Office Action dated Jul. 2, 2019, 27 pages.
AU Application No. 2020201003 First Examination Report dated Feb. 26, 2021, 5 pages.
EP Application No. 158672493 Decision to Refuse dated Mar. 12, 2021, 13 pages.
EP Application No. 158672493 Provisional Opinion re Oral Proceedings dated Feb. 18, 2021, 9 pages.
EP Application No. 15867985.2 Decision to Refuse dated Mar. 12, 2021, 9 pages.
EP Application No. 15867985.2 Provisional Opinion re Oral Proceedings dated Feb. 18, 2021, 6 pages.
EP Application No. 15868450.6 2 Provisional Opinion re Oral Proceedings dated Feb. 18, 2021, 7 pages.
EP Application No. 15868450.6 Decision to Refuse dated Mar. 15, 2021, 12 pages.

* cited by examiner

SYSTEM AND METHOD FOR ADJUSTING AN IMAGE FOR A VEHICLE MOUNTED CAMERA

CROSS-REFERENCE TO RELATED APPLICATIONS

This application claims the benefit of U.S. provisional patent application Ser. No. 61/778,641 filed Mar. 13, 2013, which is a continuation-in-part of U.S. patent application Ser. No. 13/567,323, filed Aug. 6, 2012 and claims priority to U.S. Patent Application Ser. Nos. 61/515,549, filed Aug. 5, 2011 and 61/563,126, filed Nov. 23, 2011, the entire contents of which are incorporated herein by reference.

TECHNICAL FIELD

The present invention is generally related to vehicle mounted cameras. More particularly, example embodiments of the present invention are related systems and methods for adjusting an image, e.g., an image horizon, for a vehicle mounted camera.

BACKGROUND OF THE INVENTION

Vehicle mounted cameras are utilized in a variety of applications, from personal use to record street or track or flight performance to professional use in racecars.

Referring to Prior Art FIGS. 1 and 2, a traditional camera image in NASCAR is illustrated generally at 10, with FIGS. 1 and 2 illustrating a fixed image horizon (note virtual image horizon line 12 provided across the image to show the fixed perspective of the image) relative to the hood 14 of the racecar between a straightaway and a turn. However, this virtual line 12 shows a change in horizon relative to the sky 16 due to a change in angle of the track.

What is needed in the art is a system and method that permits adjustment of an image from a vehicle mounted camera in a desired fashion.

SUMMARY OF THE INVENTION

The present system and method for adjusting an image for a vehicle mounted camera overcomes and alleviates the problems and disadvantages in the prior art by providing an adjustable image that adjusts in response to at least one vehicle mounted sensor.

In exemplary embodiments, telemetry of a vehicle from a plurality of sensors may be used to automatically adjust an image, e.g. an image horizon, in a desired way.

In other exemplary embodiments, data from at least one sensor is used to automatically adjust an image horizon to match a skyline horizon during tilting of a vehicle, for example as a racecar banks around a turn off of a straightaway.

In other exemplary embodiments, both image horizon and zoom are automatically adjusted during tilting of a vehicle.

In exemplary embodiments, such image horizon adjustment may be provided as a digital video effect, alleviating the need to actually adjust the angle of a camera during vehicle tilt.

The above and other exemplary embodiments will be discussed in more detail below in the detailed description of the invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. In the FIGURES.

PRIOR ART

PRIOR ART

PRIOR ART

DETAILED DESCRIPTION OF THE INVENTION

Figure 1:
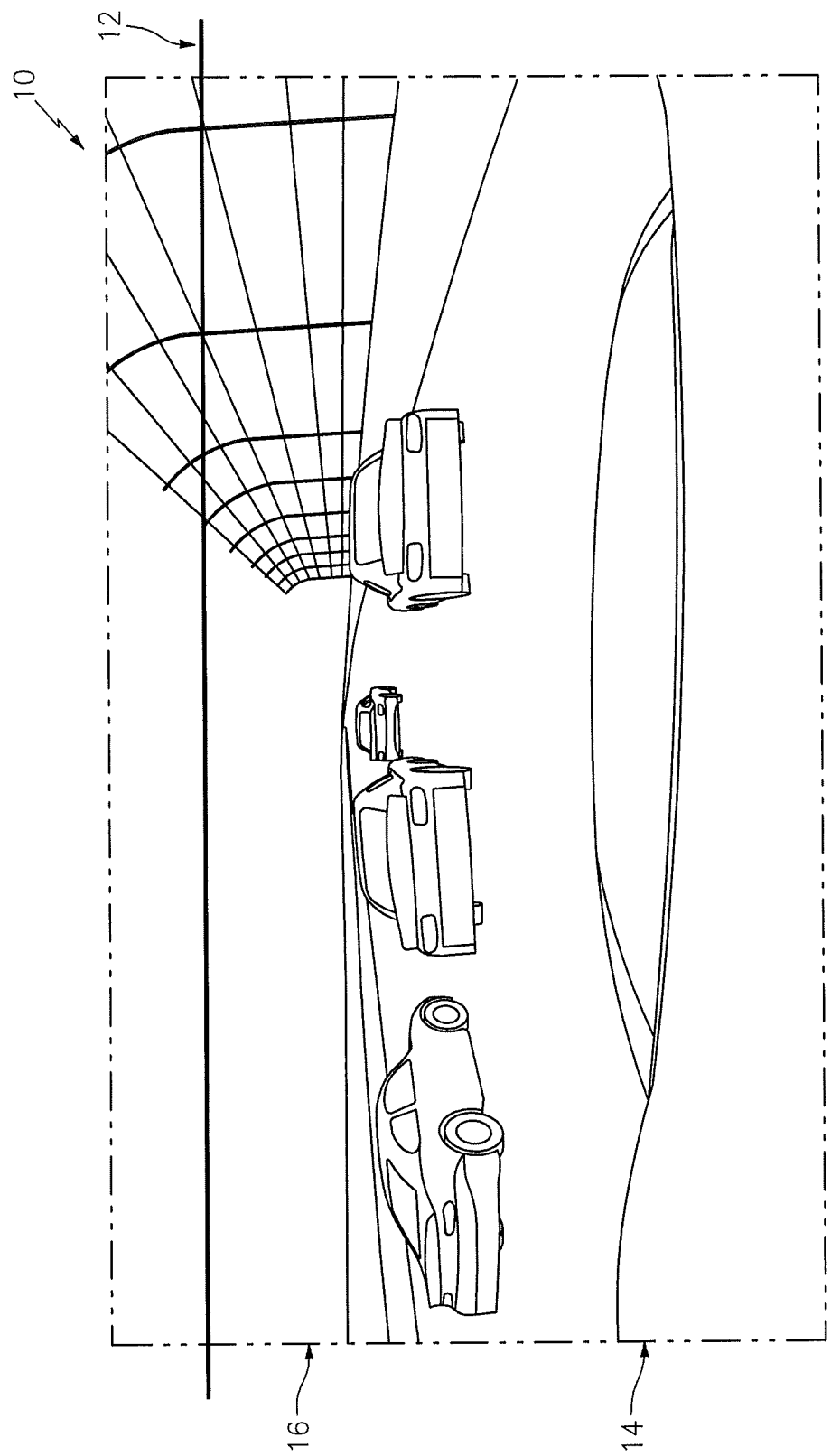
FIG. 1 is a view of a racecar camera image with a fixed image horizon on a racetrack straightaway.

Further to the brief description provided above and associated textual detail of each of the FIGURES, the following description provides additional details of example embodiments of the present invention. It should be understood, however, that there is no intent to limit example embodiments to the particular forms and particular details disclosed, but to the contrary, example embodiments are to cover all modifications, equivalents, and alternatives falling within the scope of example embodiments and claims. Like numbers refer to like elements throughout the description of the FIGURES.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGURES. For example, two FIGURES shown in succession, or steps illustrated within any given FIGURE, may in fact be executed substantially concurrently or may sometimes be executed in the reverse order, depending upon the functionality/acts involved.

Hereinafter, exemplary embodiments of the present invention are described in detail.

As we noted above, the present invention relates to adjusting an image, e.g., an image horizon, for a vehicle mounted camera by providing an image that adjusts in response to at least one vehicle mounted sensor.

In exemplary embodiments, telemetry of a vehicle from a plurality of sensors may be used to automatically adjust an image horizon in a desired way. Sensor data may include any convenient type of data, including gyro data, vehicle angle, attitude, altitude, speed, acceleration, traction, etc., data, navigational data, or the like. Sensor data may also comprise data that describes environmental conditions for the vehicle, such as weather, sensed track conditions, wind, including turbulence, shear, etc., temperature, and others, including any sensed data that may be useful in adjusting an image.

Figure 9:
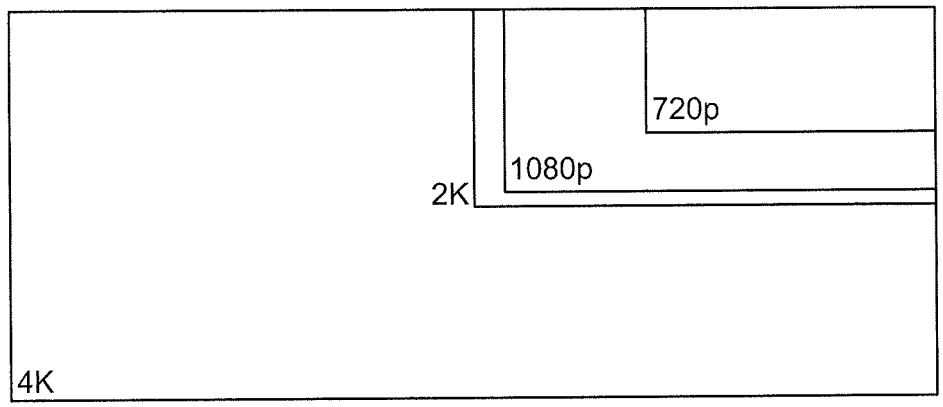
FIG. 9 is a diagram comparing relative pixel dimensions of high definition and greater than high definition images.

Such adjusting of an image may include, as in specific examples described below, adjustment of an image horizon, or another type of image adjustment, such as crop, selection of image portions, tracking of objects of interest in images, rendering selective high definition images from greater than high definition cameras, selective capture of image points of interest, adjustment of the image responsive to environmental conditions, etc. Examples are described by co-pending U.S. patent application Ser. No. 13/567,323 to the present inventor, filed Aug. 6, 2012 and claiming priority to U.S. Patent Application Ser. Nos. 61/515,549, filed Aug. 5, 20011 and 61/563,126, filed Nov. 23, 2011, the entire contents of which are incorporated herein by reference. A selection from Ser. No. 13/567,323 relating to selective capture and presentation of native image portions follows:

Common image or video formats are typically referred to either in terms of vertical resolution or horizontal resolution. Prior Art FIG. 9 shows an example of relative pixel dimensions at a 2.39:1 aspect ratio, with 720p and 1080p formats being letterboxed.

Examples of vertical high resolution designators are 720p (1280×720 pixels), 1080i (utilizing an interlace of two fields of 1920×540 pixels for a total resolution of 1920×1080 pixels) or 1080p (representing a progressive scan of 1920× 1080 pixels).

Examples of horizontal high resolution designators, which are more common to digital cinema terminology, include 2K (2048 pixels wide) and 4K (4096 pixels wide). Overall resolution would depend on the image aspect ratio, e.g. a 2K image with a Standard or Academy ratio of 4:3 would have an overall ratio of 2048×1536 pixels, whereas an image with a Panavision ratio of 2.39:1 would have an overall ratio of 2048×856 pixels. PRIOR ART FIG. 9 illustrates a comparison of relative pixel dimensions for 720p, 1080p, 2K and 4K captured images.

Currently, technologies exist for greater than high definition capture for digital cinema, e.g. up to 2K, 4K and beyond. However, for consumer home viewing of the captured digital cinema, the captured image is compressed down at the distributing studio to a version that is specific to traditional usable consumer high definition formats for broadcast or other distribution, e.g., at 720p, 1080i or 1080p.

Also, while digital cinema has utilized large resolution capture, traditional broadcast capture has not. This broadcast capture is performed at the desired consumer display resolution, e.g., 1080p, both due to limitations at the consumer display device as well as to bandwidth restrictions of broadcast carriers. Thus, in scenarios calling for magnification of the broadcast image, for example to better show selected detail within an image, the display resolution is considerably less than the native image captured at the venue.

In exemplary embodiments related to selective capture, a first image or video is captured at a first resolution, which resolution is greater than high definition and higher than a predetermined broadcast display resolution. A desired portion of the first image or video is then displayed at a second, lower resolution, which resolution is less than and closer to the predetermined broadcast display resolution. Accordingly, a selected portion of the captured image may be displayed at or near the predetermined broadcast display resolution (i.e., minimizing or eliminating loss of image detail relative to the predetermined broadcast display resolution).

Figure 10:
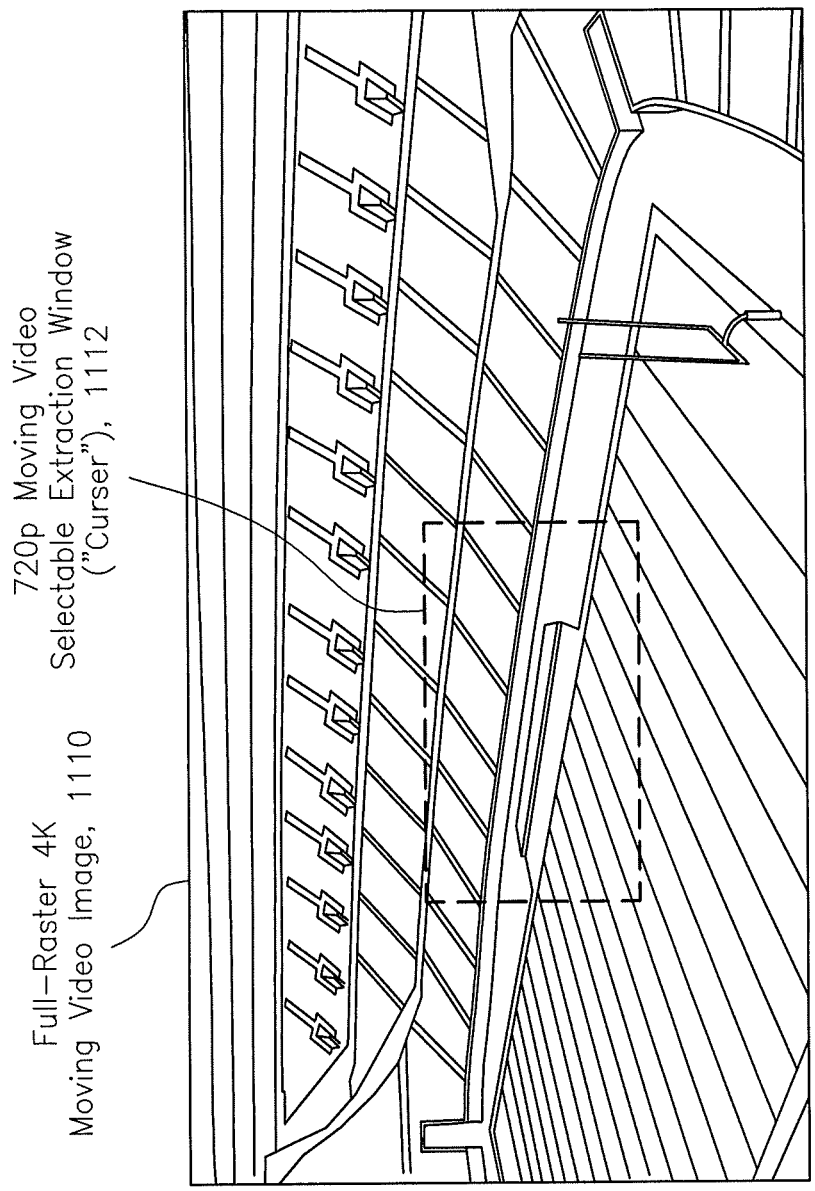
FIG. 10 is an exemplary graphical user interface of a 4K captured image with a 720p selectable extraction window.

An example of this is illustrated at FIG. 10, which shows a screenshot of a full-raster 4K moving video image 1110. A portion of the 4K image, illustrated as a 720p moving video selectable extraction window 1112, is then selected for presentation. Thus, native image capture occurs at a greater than high definition resolution, and portions of that greater than high definition image are selected for presentation via the 720p extraction window. While, FIG. 10 specifically illustrates 4K capture and a 720p extraction window, it should be recognized that both or either of the captured image and extraction window may be provided at or sized to other resolutions.

Also, while one extraction window is illustrated in FIG. 10, the present disclosure contemplates simultaneous multiple extraction windows that may be applied to the same captured image.

In further exemplary embodiments, the selectable extraction window (1112 in FIG. 10) is provided at a graphical user interface ("GUI") (1114 in FIGS. 11 and 12) that is configured to allow an operator to navigate within a captured image and select portions of the captured image for presentation. In exemplary embodiments, the extraction window is configured to allow the operator to adjust the size and position of the extraction window. In other exemplary embodiments, the extraction window is configured to track or scan across moving images, e.g., to follow a play or subject of interest during a sporting event. In other exemplary embodiments, plural operators may extract from the same images via the same or via plural GUIs.

Figure 11:
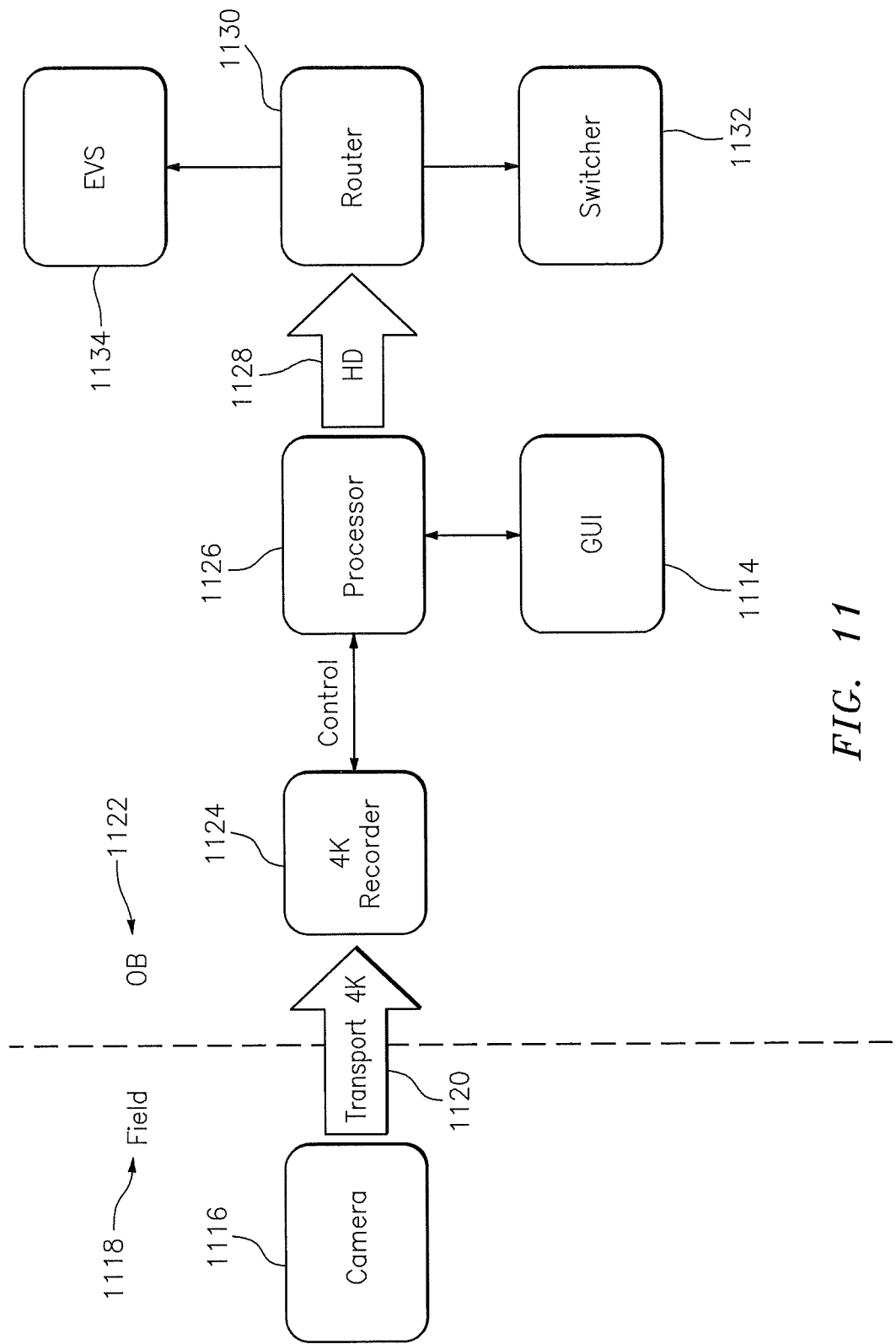
FIG. 11 is an exemplary first system for capturing and transporting a 4K image to an offsite processor and graphical user interface.
Figure 12:
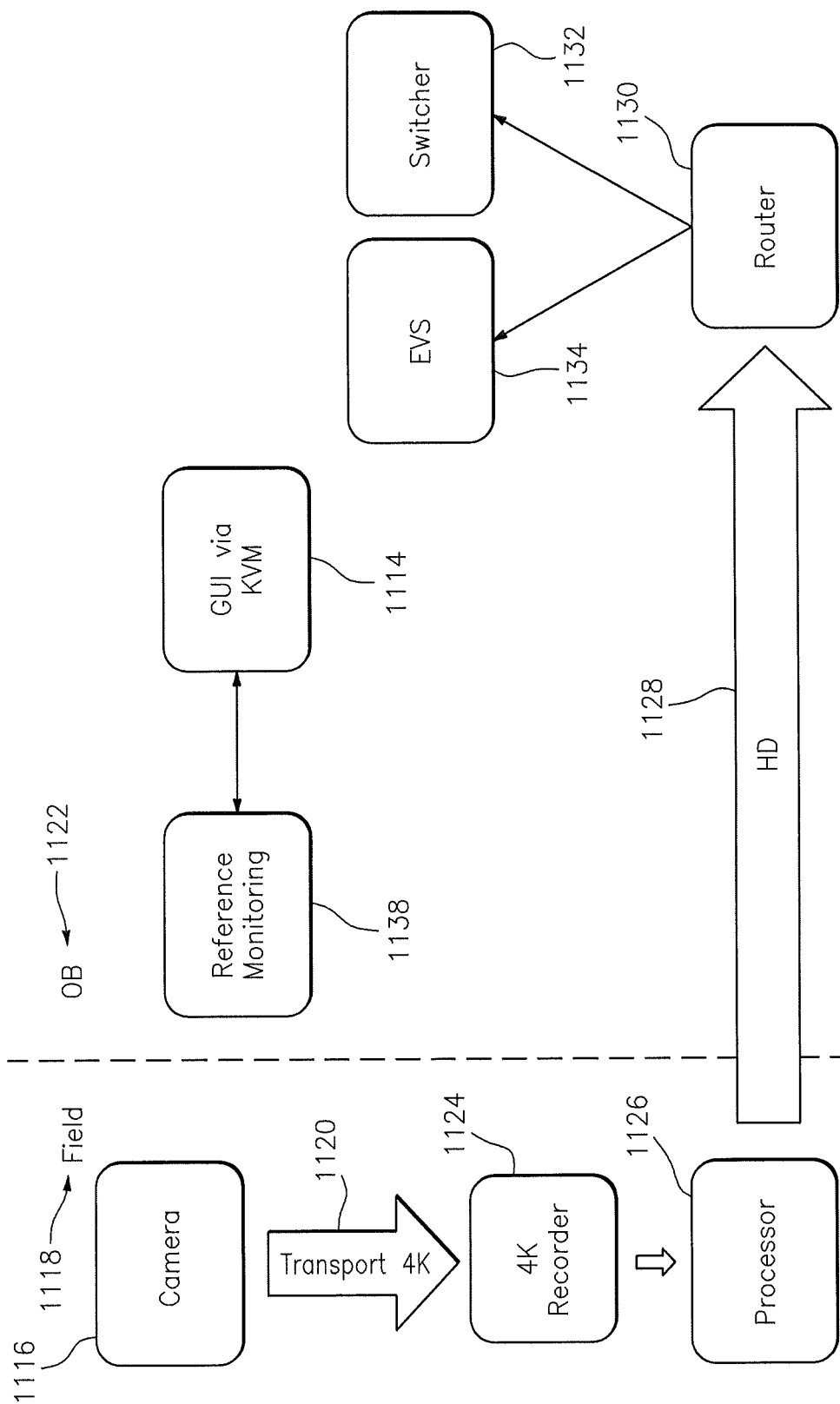
FIG. 12 is an exemplary second system for capturing and processing a 4K image onsite, followed by transport of a high definition image offsite.

Referring now to FIGS. 11 and 12, processing of the captured images may occur either offsite (FIG. 11) or onsite (FIG. 12). Referring to FIG. 11, an exemplary system is illustrated wherein a camera 1116 captures 4K images onsite, e.g., at a field (shown generally at 1118) for a sporting event. A transport mechanism 1120, e.g. a fiber capable of transporting a full bandwidth 4K video, transports the captured images to an operations base ("OB") (shown generally at 1122), e.g., a production truck away from the field 1118.

An image recorder 1124 records the captured images, e.g., as a data stream on a server, and is configured to allow an operator to go back in time relative to the recording and examine selected portions of the captured image as described above. Such control is provided to an operator via the GUI 1114 through a processor 1126 interfacing with the GUI 1114 and recorder 1124. In exemplary embodiments, the recorder, processor and GUI are configured to allow the operator to go back instantaneously or near-instantaneously to select portions of the recorded image for presentation.

For example, with regard to FIG. 10, an operator in a truck would use a GUI to navigate the full raster 4K image and maneuver the selective 16:9 extraction window, in a manner similar to a cursor, to select an area of interest. In exemplary embodiments, the GUI is configured such that the extraction window may select an area of interest in one or both of live and recorded video. Also, as has been noted above, the present disclosure contemplates sizing and zooming capabilities for the extraction window. In other exemplary embodiments, the system is configured to mark keyframes and establish mapping for desired moves, e.g., pans and zooms, among others, around the image.

Referring again to FIG. 11, in exemplary embodiments, the output 1128 of the system (e.g., a 720p/59.94 output relative to a 4K capture) is provided to a router 1130 that allows the output to be taken live to a switcher 1132 or to be ingested at a server 1134 ("EVS") for later playout. Also, in exemplary embodiments, a resulting image can be slowed down for replay or rendered as a still image, if desired, either at the server 1134 or at the operator's position (via processor 1126).

FIG. 12 provides an alternate exemplary embodiment, wherein capture, transport and recording of the native image (in this example 4K images) occurs onsite, e.g., at the field 1118 of a sporting event). An onsite processor 1126 provides or interfaces with an operator GUI 1114 in an operations base 1122 (e.g., a truck, though the GUI could be accessed from any convenient location) and provides a reference video 1138 of the image to allow the operator to navigate the image via the extraction window. The output 1128 is then transported from the field to an offsite router 1130.

In another embodiment, at least one GUI is accessed by a tablet controller as a navigation tool for the system. Such tablet controller may be wireless and portable to allow for flexible a primary or supplemental navigation tool.

In other exemplary embodiments, multiple cameras may be positioned to capture images from different points of view, and extraction windows may be provided relative to the multiple image captures in a system for selectively displaying portions of native images from different points of view.

Further exemplary embodiments provide real time or near real time tracking of subjects of interest (e.g., identified, selected or pre-tagged players of interest or automatic tracking of a ball in a game). Additional exemplary embodiments also provide virtual directing of operated and automatically tracked subjects of interest for cutting into a full live broadcast, utilizing backend software and tracking technology to provide a virtual viewfinder that operates in manners similar to otherwise human camera operators. Such processes may also use artificial technology for simple tracking, e.g., of a single identified object, or for more complex operations approximating motions utilized by human camera operators, e.g., pan, tilt and zoom of the extraction window in a manner similar to human operators. For those examples using 4K (or the like) capture, camera capture could utilize a specifically designed 4K camera. A camera may also use wider lensing to capture more of the subject, with possible reconstituting or flattening in post production. Also, different lensing can be used specific to different applications.

Such processes may use the above-described multiple cameras and/or multiple extraction windows, or may run with specific regard to one camera and/or one extraction window. In such a way, an artificial intelligence can automatically capture, extract and display material for broadcast, utilizing the extraction window(s) as virtual viewfinders.

Additional exemplary embodiments also provide for virtual 3D extraction, e.g. via s single camera at 4K or 8K with a two window output.

In other exemplary embodiments, an increased image capture frame rates relative to a broadcast frame rate along with or in lieu of an increased image capture resolution, as has been discussed above.

In such embodiments, a first video is captured at a first frame rate, which frame rate is higher than a predetermined broadcast frame rate. A desired portion of the first video is then displayed at a second, lower frame rate, which frame rate is less than and closer to the predetermined broadcast frame rate. The desired portion of the first video is captured by an extraction window that extracts frames across the native captured video. In such a way, the extracted video provides smooth and clear video, without edgy or blurred frames. Such captured first video may be at any frame rate that is above the predetermined broadcast frame rate.

In further exemplary embodiments, the first video is captured at a first frame rate that is in super motion or hyper motion. In traditional video, this equates to approximately 180 ("supermotion") frames per second or above ("hypermotion" or "ultramotion") in a progressive frame rate. In exemplary embodiments, hypermotion is recorded in discrete times sufficient to capture a triggered instance of an action of camera subject for playback. In other exemplary embodiments, the present system performs a full time record of a camera in hypermotion, e.g., of sufficient length for replay playback archiving, such as more than fifteen minutes, more than thirty minutes, more than an hour, more than an hour and a half, or more than two hours, among others.

In other exemplary embodiments, raw data from at least one camera is manipulated to adjust the image quality (make it "paintable") to broadcast specifications. In exemplary embodiments, broadcast "handles" may be integrated into the system to affect the raw data in a manner that is more germane to broadcast color temperatures, hues and gamma variables.

The present disclosure thus advantageously provides systems and methods for selective capture of and presentation of native image portions, for broadcast production or other applications. By providing exemplary embodiments using a selectable extraction window through a GUI, an operator has complete control over portions within the native images that the operator desires for presentation. Also, by providing exemplary embodiments with image capture greater than high definition (e.g., 4K), desired portions of the image selected by an operator may be presented at or relatively near high definition quality (i.e., without relative degradation of image quality). Further, by providing exemplary embodiments with image capture frame rates greater than that of a predetermined broadcast frame rate, extracted video therefrom provides smooth and clear video, without edgy or blurred frames. Finally, various exemplary embodiments utilizing enhanced GUI features, such as automatic tracking of subjects of interests, plural GUIs or extraction windows for one or plural (for different points of view) captured images provide advantageous production flexibilities and advantages.

Figure 3:
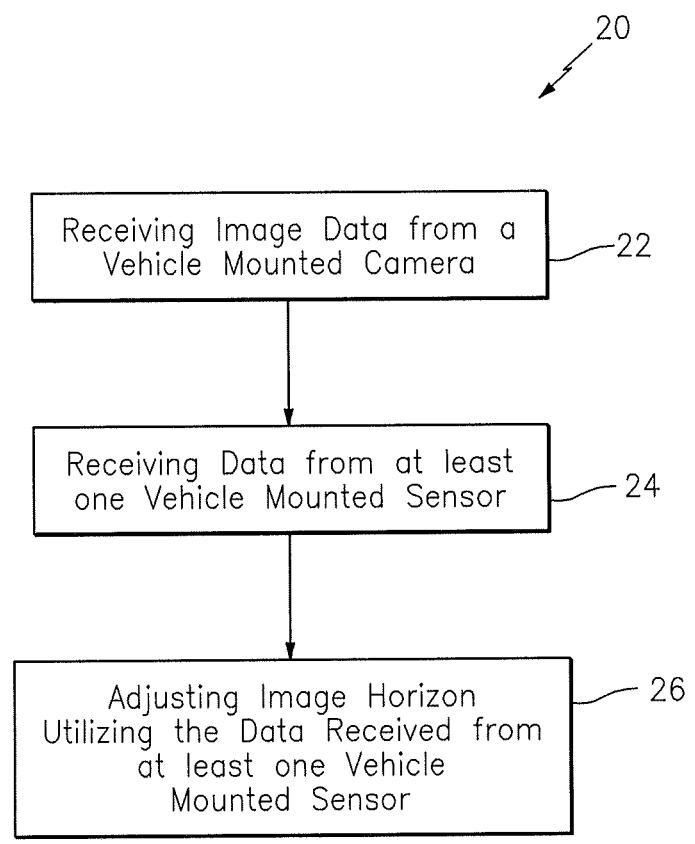
FIG. 3 is a flowchart of an exemplary method for adjusting the image horizon of a vehicle mounted camera.

Referring now to FIG. 3, an exemplary method for adjusting an image for a vehicle mounted camera is illustrated generally at 20, including receiving image data from a vehicle mounted camera (described at box 22), receiving data from at least one vehicle mounted sensor (described at box 24), and adjusting the image horizon utilizing the data received from the at least one vehicle mounted sensor (described at box 26).

In exemplary embodiments, such adjusting of the image horizon may be applied as a digital video effect, such that actual manipulation of a vehicle mounted camera is unnecessary. Further, any type of image horizon adjustment is contemplated, whether or not such adjustment results in matching image horizon with a skyline horizon.

Additionally, it should be recognized that some or all of image adjustment may be performed on the vehicle. For example, an on-board (on the vehicle) processor may perform some or all of the image adjustment based upon data from the at least one sensor. Allocating processing power to the vehicle may be particularly useful, e.g., in wireless transmission applications where a reduced data package can take advantage of bandwidth limitations. Further, in exemplary embodiments, an operator can communicate with an on-board processor over a separate channel, leaving one or more wireless transmission channels from the vehicle substantially dedicated to video output.

Additionally, exemplary embodiments contemplate automatic adjustment of image horizon based upon received vehicle telemetry data.

Figure 2:
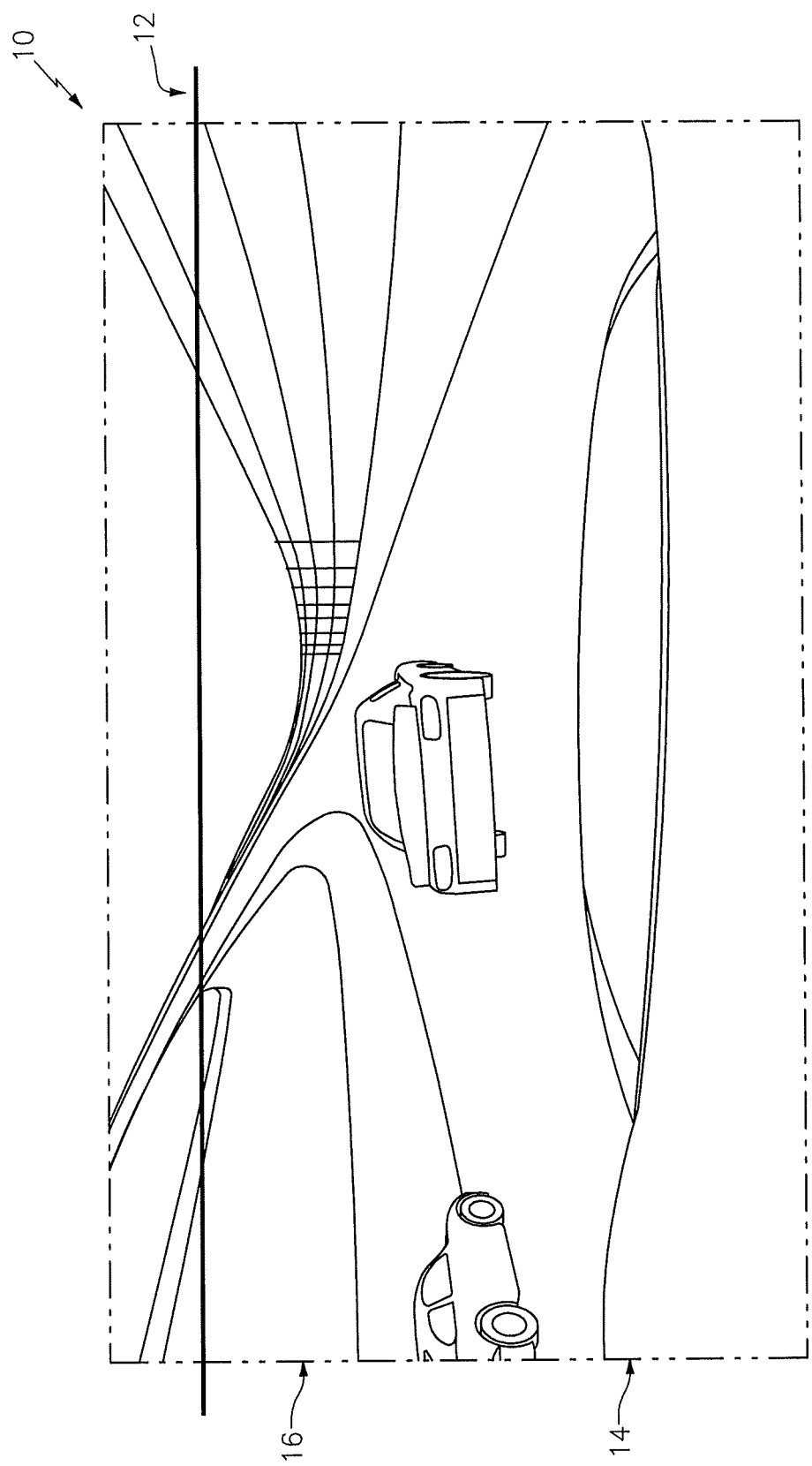
FIG. 2 is a view of the racecar camera image with a fixed image horizon on a banked turn of a racetrack.
Figure 4:
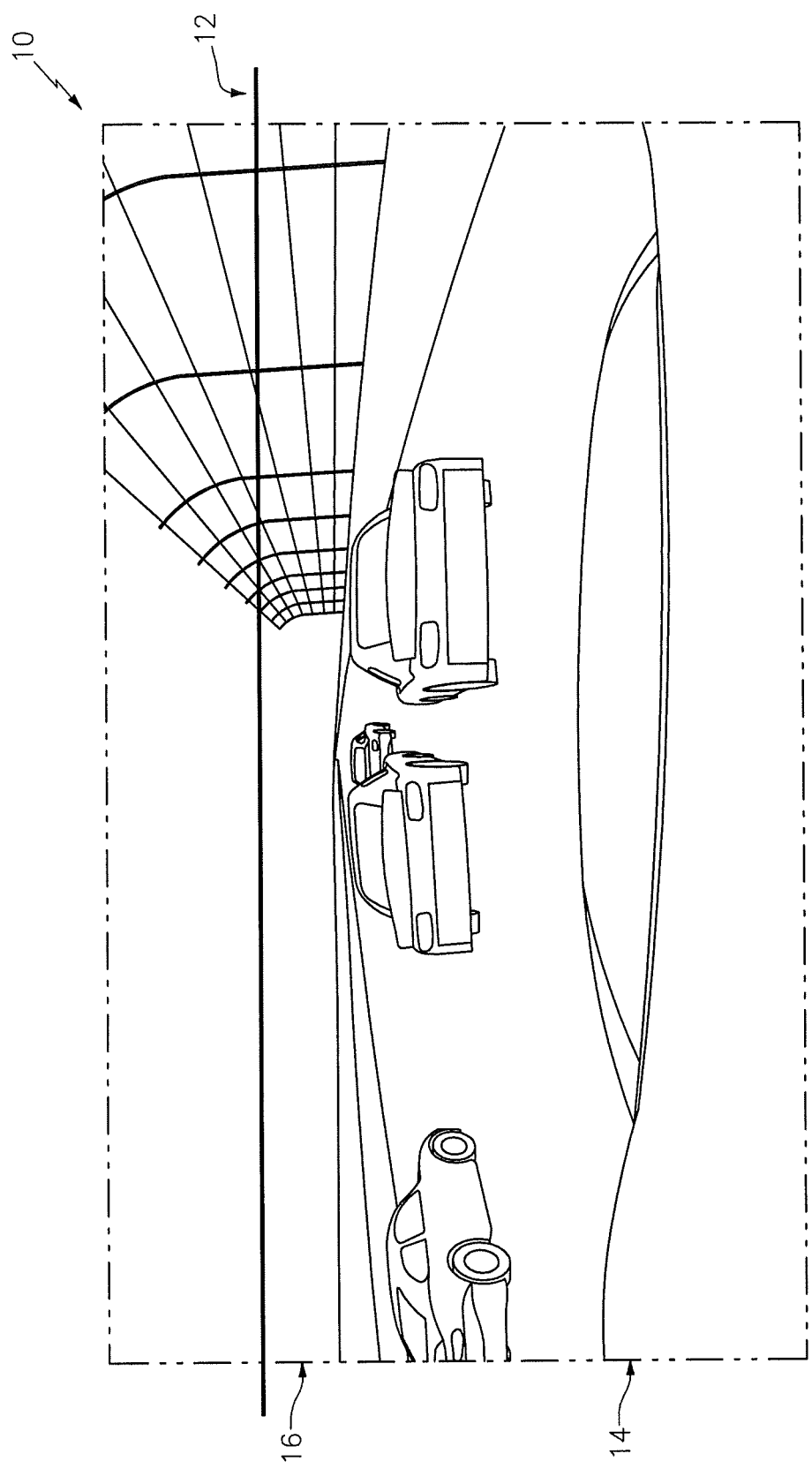
FIG. 4 is a view of a racecar camera image with an adjustable image horizon on a racetrack straightaway.
Figure 5:
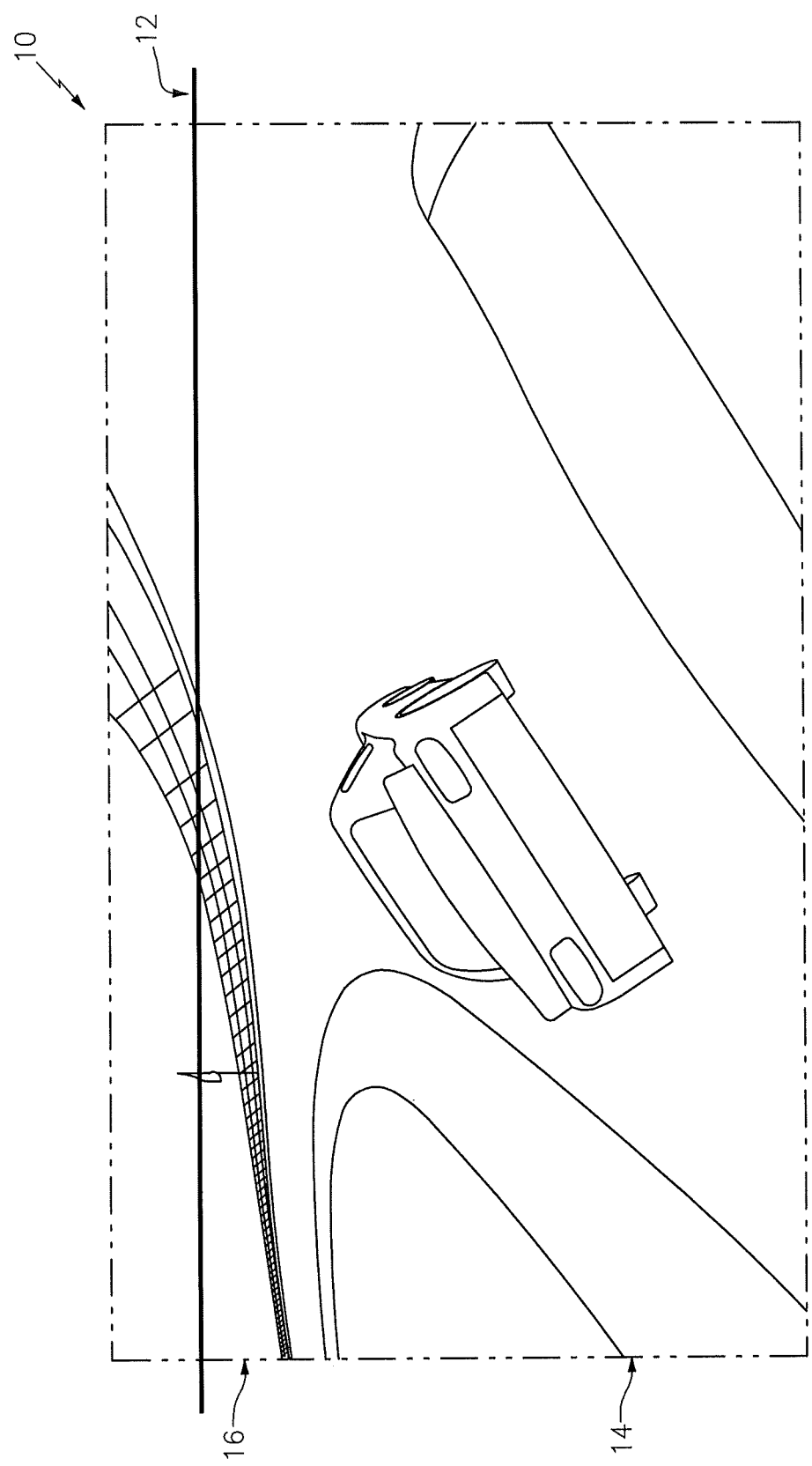
FIG. 5 is a view of a racecar camera image with an adjusted image horizon on a racetrack turn with zoom remaining constant.

In other exemplary embodiments, data from at least one sensor is used to automatically adjust an image horizon to match a skyline horizon during tilting of a vehicle, for example as a racecar banks around a turn off of a straightaway. Reference is made to FIGS. 4 and 5, as compared to PRIOR ART FIGS. 1 and 2. FIGS. 4 and 5 show exemplary adjustment of an image horizon 12 such that it matches a skyline horizon (shown as line 28) during tilting of a racecar as it transitions from a straightaway to a banked turn.

Figure 6:
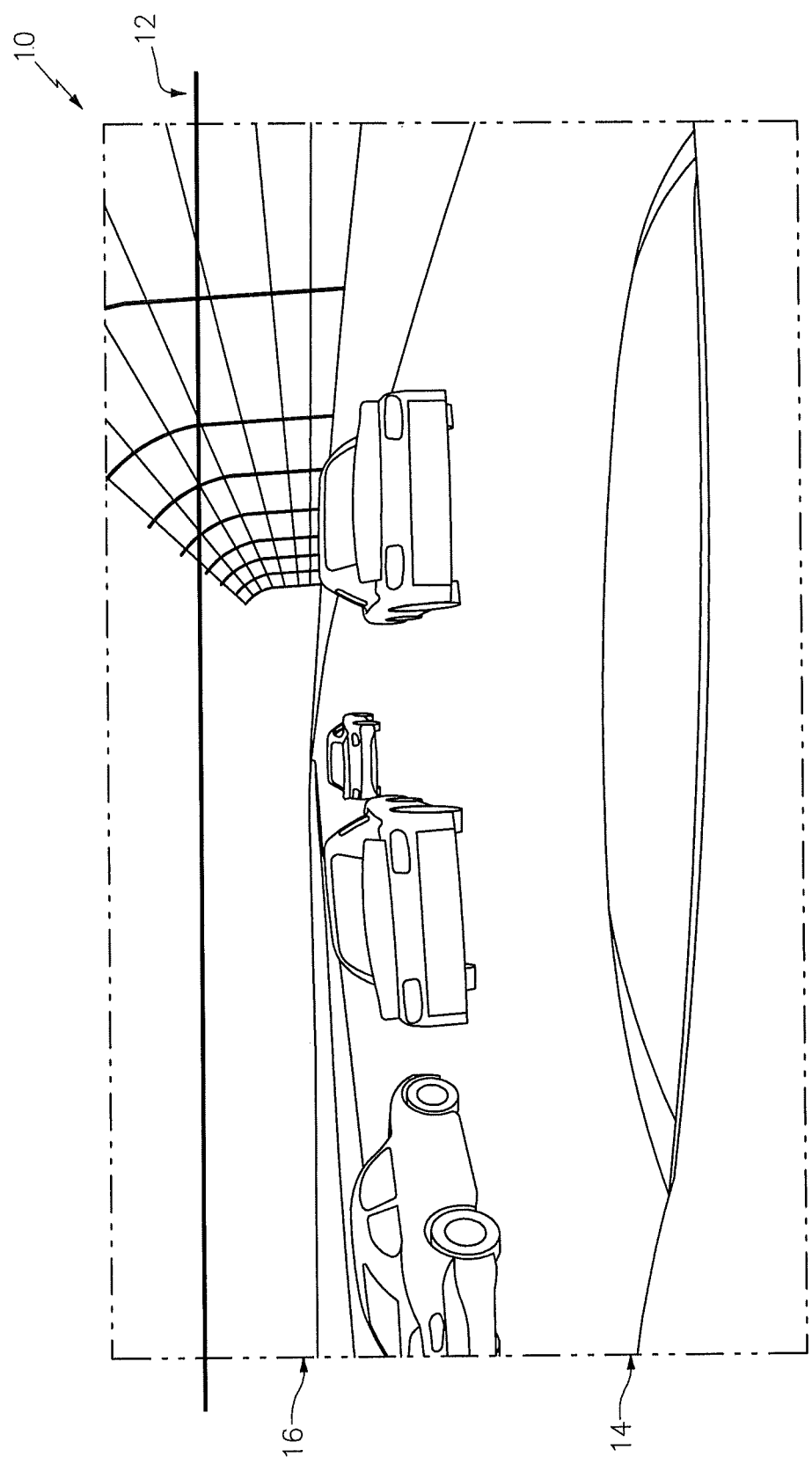
FIG. 6 is a view of a racecar camera image with an adjustable image horizon on a racetrack straightaway.
Figure 7:
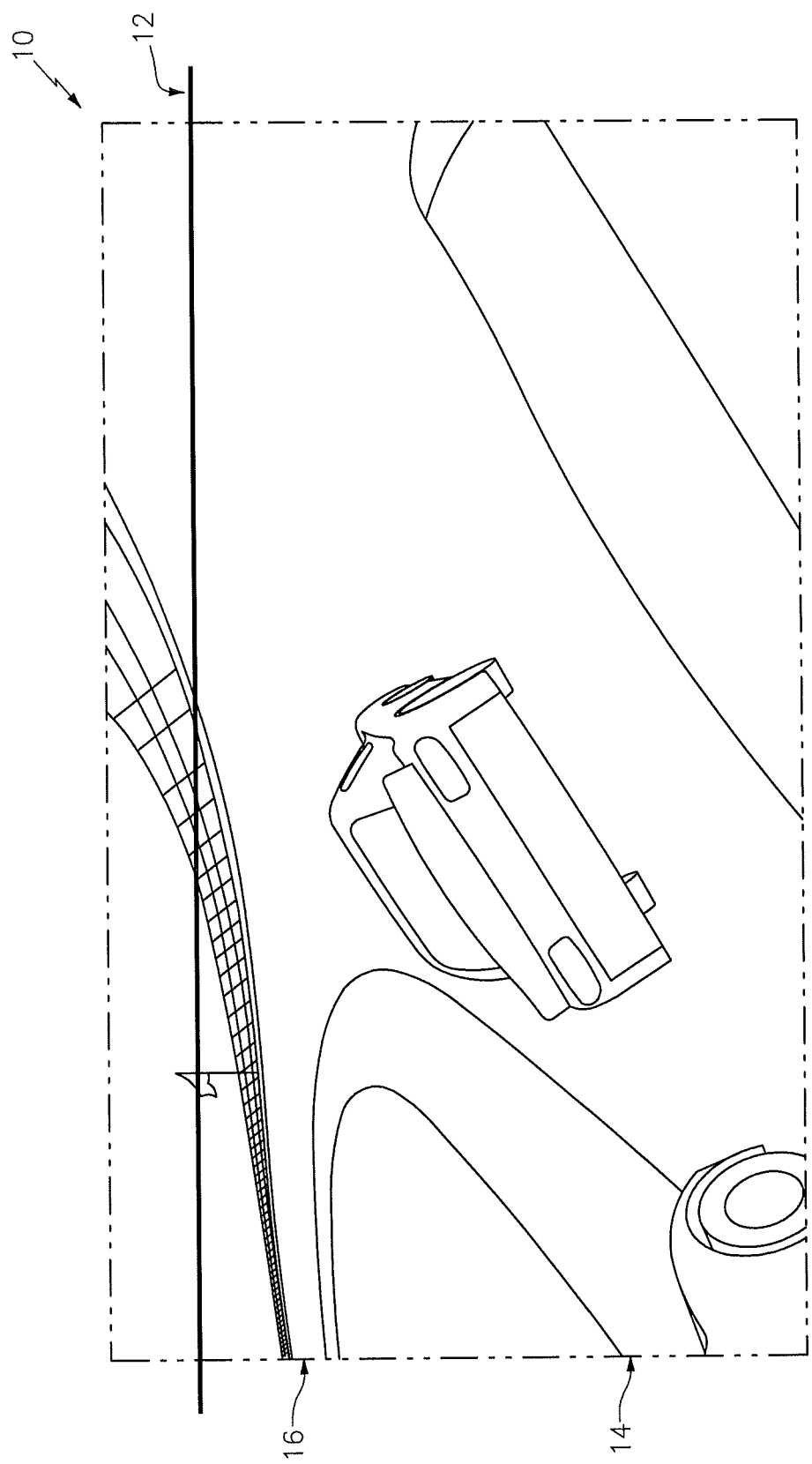
FIG. 7 is a view of a racecar camera image with an adjusted image horizon on a racetrack turn adjusted zoom.

In other exemplary embodiments, both image horizon and zoom are automatically adjusted during tilting of a vehicle. Reference is made to FIGS. 6 and 7, as compared to PRIOR ART FIGS. 1 and 2. FIGS. 6 and 7 show exemplary adjustment of an image horizon 12 such that it matches a skyline horizon (shown as line 28) during tilting of a racecar as it transitions from a straightaway to a banked turn, with an increase in zoom during the turn.

Figure 8:
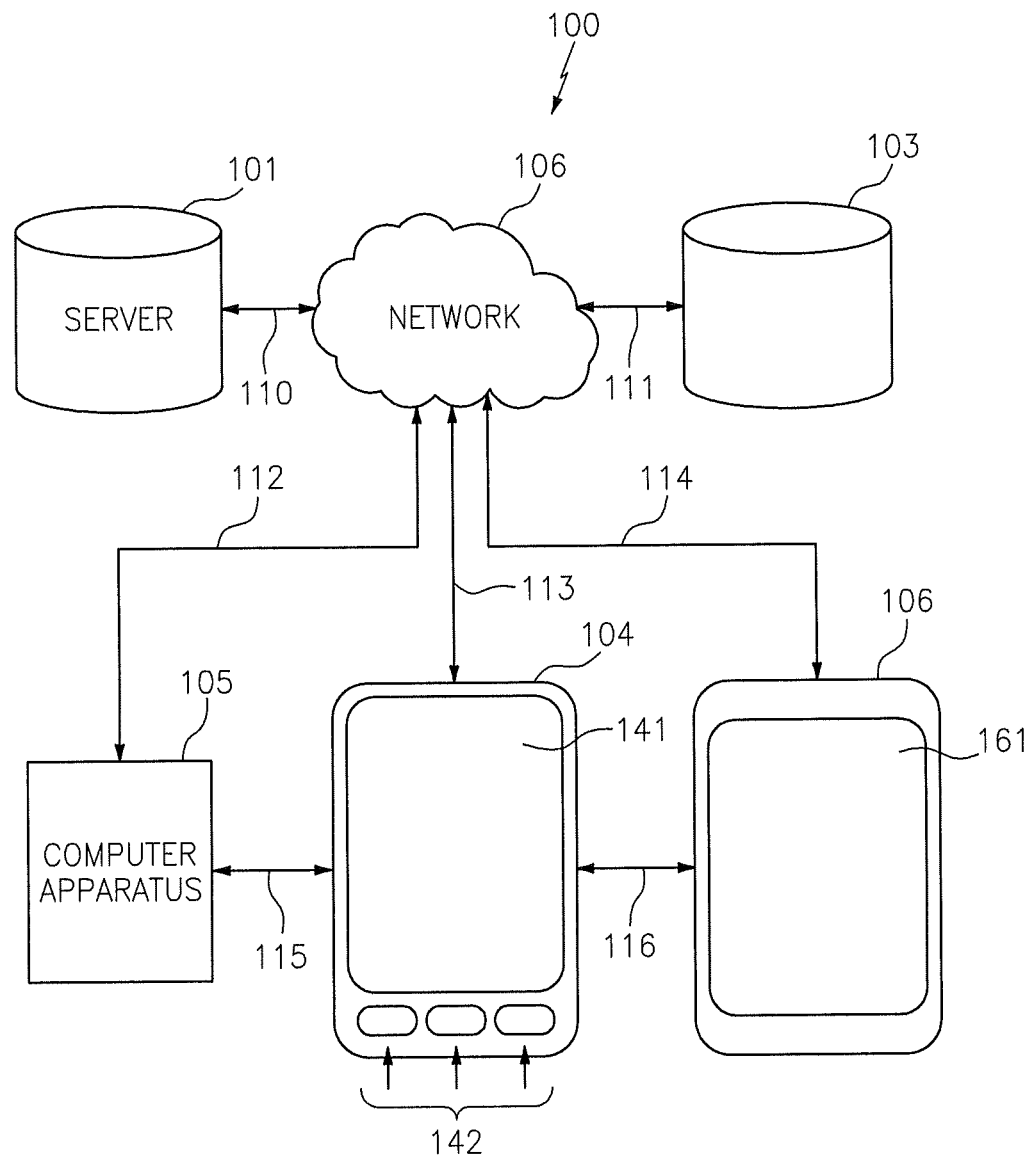
FIG. 8 is an exemplary system for adjusting image for a vehicle mounted camera.

FIG. 8 illustrates an exemplary system for adjusting an image horizon from a vehicle mounted camera. The system 100 may include a server 101. The server 101 may include a plurality of information, including but not limited to, vehicle telemetry information, static and continuous video images from a vehicle mounted camera, algorithms and processing modules and other data storage. The server 101 may be in communication with a network 106 via a communication channel 110.

Additionally, the system 100 may access or interface with additional, third party data sources or servers 103. Third party sources of data 103 may be in communication with the network 106 via a communication channel 111. It is noted that although illustrated as separate, the source 103 may include a server substantially similar to server 101. The server 101 or source 103 may include a data service provider, for example, a cellular service provider, a business information provider, or any other suitable provider or repository. The server 101 or source 103 may also include an application server providing applications and/or computer executable code implementing any of the interfaces/methodologies described herein. The server 101 or source 103 may present a plurality of application defaults, choices, set-ups, and/or configurations such that a device may receive and process the application accordingly. The server 101 or source 103 may present any application on a viewer interface or web-browser of a device for relatively easy selection by a viewer of the device.

Alternately, another server component or local computer apparatus, e.g., 104, 105 and/or 106, may produce the viewer interface and control connectivity to the server 101 or source 103. Also, the server 101 or one or more of the local computer apparatus 104, 105 and 106 may be configured to periodically access the source 103 and cache data relevant to data used in embodiments of the present invention.

The network 106 may be any suitable network, including the Internet, wide area network, and/or a local network. The server 101 and the source 103 may be in communication with the network 106 over communication channels 110, 111. The communication channels 110, 111 may be any suitable communication channels including wireless, satellite, wired, or otherwise.

An exemplary system 100 further includes computer apparatus 105 in communication with the network 106, over communication channel 112. The computer apparatus 105 may be any suitable computer apparatus including a personal computer (fixed location), a laptop or portable computer, a personal digital assistant, a cellular telephone, a portable tablet computer, a portable audio player, or otherwise. For example, the system 100 may include computer apparatuses 104 and 106, which are embodied as a portable cellular telephone and a tablet, respectively. The apparatuses 104 and 106 may include display means 141, 161, and/or buttons/controls 142. The controls 142 may operate independently or in combination with any of the controls noted above.

Further, the apparatuses 104, 105, and 106 may be in communication with each other over communication channels 115, 116 (for example, wired, wireless, Bluetooth channels, etc); and may further be in communication with the network 106 over communication channels 112, 113, and 114.

Therefore, the apparatuses 104, 105, and 106 may all be in communication with one or both of the server 101 and the source 103, as well as each other. Each of the apparatuses may be in severable communication with the network 106 and each other, such that the apparatuses 104, 105, and 106 may be operated without constant communication with the network 106 (e.g., using data connection controls of an interface). For example, if there is no data availability or if a viewer directs an apparatus to work offline, the data used by any of the apparatuses 104, 105, and 106 may be based on stored or cached information/parameters. It follows that each of the apparatuses 104, 105, and 106 may be configured to perform the methodologies described in the various exemplary embodiments.

Furthermore, using any of the illustrated communication mediums, the apparatuses 104, 105, and 106 may manipulate, share, transmit, and/or receive different data previously or currently produced at any one of the illustrated elements of the system 100. For example, data may be available on the server 101 and/or the source 103. Moreover, viewers of any of the devices 104, 105, and 106 may independently manipulate, transmit, etc., data, e.g., to separately determine a current value of the index at a given time. Thus, any suitable device may be utilized to use vehicle telemetry data from at least one vehicle sensor to adjust image horizon from a vehicle mounted camera.

It should be emphasized that the above-described embodiments of the present invention, particularly, any detailed discussion of particular examples, are merely possible examples of implementations, and are set forth for a clear understanding of the principles of the invention. Many variations and modifications may be made to the above-described embodiment(s) of the invention without departing from the spirit and scope of the invention. All such modifications and variations are intended to be included herein within the scope of this disclosure and the present invention and protected by the following claims.

What is claimed is:

1. A method for adjusting a broadcast image for a vehicle mounted camera, comprising:
   providing a camera mounted in a vehicle, the camera configured provide an image for a broadcast;
   providing at least one sensor in said vehicle, the sensor detecting a change in tilt of said vehicle upon entry of the vehicle into a high banked turn on a racetrack; and
   automatically adjusting an image horizon and zoom in response to said detected change in tilt of said vehicle.

2. A method in accordance with claim 1, wherein said image horizon automatically adjusts in response to said detected change in tilt of said vehicle.

3. A method in accordance with claim 2, wherein said image horizon is adjusted as a digital video effect.

4. A method in accordance with claim 1, wherein said detected change in tilt is provided as vehicle telemetry data.

5. A method in accordance with claim 2, wherein said image horizon is adjusted to match or approximate a skyline horizon during tilting of said vehicle.

6. A method in accordance with claim 2, wherein said image horizon is adjusted with a variation in zoom of the image.

7. A method in accordance with claim 1, further comprising:
   capturing a first image or video at a first resolution, which resolution is greater than high definition and higher than a predetermined second, output display resolution;
   selecting a first desired portion of the captured, native first image or video, wherein said first portion is at a resolution lower than that of the captured first image or video; and
   displaying said selected first portion at said second, output resolution.

8. A method in accordance with claim 7, wherein said selecting of a desired first portion of the first image or video is provided by a graphical user interface having a selectable extraction window.

9. A method in accordance with claim 8, wherein said extraction window is configured to allow an operator to navigate within said captured image or video and select portions thereof for presentation.

10. A system for adjusting a broadcast image for a vehicle mounted camera, comprising:
    a camera mounted in a vehicle, the camera configured provide an image for a broadcast;
    at least one sensor in said vehicle, the sensor configured to a change in tilt of said vehicle;
    a processor configured to access camera image data and data indicating tilt of said vehicle upon entry of the vehicle into a high banked turn on a racetrack; and
    a digital video effects component, the digital video effects component configured to automatically adjust an image horizon and zoom in response to said detected change in tilt of said vehicle.

11. A system in accordance with claim 10, wherein said digital video effects component is configured to automatically adjust image horizon in response to said detected change in tilt of said vehicle.

12. A system in accordance with claim 11, wherein said detected change in tilt is provided as vehicle telemetry data.

13. A system in accordance with claim 11, wherein said image horizon is adjusted to match or approximate a skyline horizon during tilting of said vehicle.

14. A system in accordance with claim 10, wherein said image horizon is adjusted with a variation in zoom of the image.

15. A system in accordance with claim 10, wherein said camera is configured to capture a first image or video at a first resolution, which resolution is greater than high definition and higher than a predetermined second, output display resolution, the system further comprising:
    a processor in communication with a graphical user interface, said interface configured to select a first desired portion of the native, first image or video, wherein said first portion is at a resolution lower than that of the captured first image or video; and
    an output mechanism configured to transport said selected first portion to a router, switcher or server at said second, output resolution.

16. A system in accordance with claim 15, wherein said graphical user interface has a selectable extraction window.

17. A system in accordance with claim 16, wherein said extraction window is configured to allow an operator to navigate within said captured image or video and select portions thereof for presentation.

18. A method for adjusting a broadcast image for a vehicle mounted camera, comprising:
    providing a camera mounted in a vehicle, the camera configured provide an image for a broadcast;
    providing at least one sensor in said vehicle, the sensor detecting a data of interest relative to said vehicle upon entry of the vehicle into a high banked turn on a racetrack; and
    automatically adjusting an image inclusive of image horizon and zoom in response to said detected data of said vehicle.

19. A method in accordance with claim 18, wherein said sensor data includes one or more of: gyro data; vehicle angle; attitude; altitude; speed; acceleration; traction; and navigational data.

20. A method in accordance with claim 18, wherein said sensor data includes environmental conditions for the vehicle, including one or more of: weather; sensed track conditions; wind; and temperature.

21. A method in accordance with claim 18, wherein said image adjustment includes one or more of:
    adjustment of an image horizon;
    adjustment of image crop; selection of image portions;
    tracking of objects of interest in images;
    rendering selective high definition images from greater than high definition cameras;
    selective capture of image points of interest; or adjustment of the image responsive to environmental conditions.

22. A method in accordance with claim 21, wherein said image adjustment is provided as a digital video effect.

23. A method in accordance with claim 22, wherein said at least a portion of said image adjustment is performed by an on-board vehicle processor.

24. A method in accordance with claim 23, wherein said adjusted image is transmitted via wireless protocol to an external computing device.

25. A method in accordance with claim 18, further comprising:
    capturing a first image or video at a first resolution, which resolution is greater than high definition and higher than a predetermined second, output display resolution;

selecting a first desired portion of the captured, native first image or video, wherein said first portion is at a resolution lower than that of the captured first image or video; and displaying said selected first portion at said second, output resolution.

26. A method in accordance with claim 25, wherein said selecting of a desired first portion of the first image or video is provided by a graphical user interface having a selectable extraction window.

27. A method in accordance with claim 26, wherein said extraction window is configured to allow an operator to navigate within said captured image or video and select portions thereof for presentation.

* * * * *